(12) United States Patent
Seo et al.

(10) Patent No.: US 12,110,397 B2
(45) Date of Patent: Oct. 8, 2024

(54) NANOSTRUCTURED ALUMINOSILICATE WAX CARRIER FOR ASPHALT

(71) Applicants: Dong-Kyun Seo, Chandler, AZ (US); Kamil Kaloush, Scottsdale, AZ (US); Alireza Samieadel, Tempe, AZ (US); Elham Fini, Phoenix, AZ (US); Shaojiang Chen, Mesa, AZ (US)

(72) Inventors: Dong-Kyun Seo, Chandler, AZ (US); Kamil Kaloush, Scottsdale, AZ (US); Alireza Samieadel, Tempe, AZ (US); Elham Fini, Phoenix, AZ (US); Shaojiang Chen, Mesa, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 75 days.

(21) Appl. No.: 17/220,549

(22) Filed: Apr. 1, 2021

(65) Prior Publication Data
US 2021/0309858 A1     Oct. 7, 2021

Related U.S. Application Data

(60) Provisional application No. 63/004,243, filed on Apr. 2, 2020.

(51) Int. Cl.
| | | |
|---|---|---|
| C08L 95/00 | (2006.01) | |
| C08K 3/34 | (2006.01) | |
| C08L 91/06 | (2006.01) | |

(52) U.S. Cl.
CPC ............. *C08L 95/00* (2013.01); *C08K 3/34* (2013.01); *C08L 91/06* (2013.01); *C08K 2201/011* (2013.01); *C08L 2555/50* (2013.01); *C08L 2555/72* (2013.01)

(58) Field of Classification Search
CPC ...... C08L 95/00; C08L 91/06; C08L 2555/50; C08L 2555/72; C08K 3/34
USPC ........................................................ 524/59
See application file for complete search history.

(56) References Cited

U.S. PATENT DOCUMENTS

| | | | |
|---|---|---|---|
| 3,723,308 | A | 3/1973 | Breck |
| 6,229,032 | B1 | 5/2001 | Jacobs et al. |
| 10,829,382 | B2 | 11/2020 | Seo et al. |
| 11,186,490 | B2 | 11/2021 | Seo et al. |
| 2007/0227351 | A1* | 10/2007 | Garcia-Martinez ...... B01J 29/80 210/660 |
| 2017/0030077 | A1* | 2/2017 | Wang .................... C09K 5/063 |

FOREIGN PATENT DOCUMENTS

WO    WO 2022/266594     12/2022

OTHER PUBLICATIONS

U.S. Appl. No. 63/371,603, filed Aug. 16, 2022, Fini et al.
U.S. Appl. No. 63/485,123, filed Feb. 15, 2023, Fini et al.
U.S. Appl. No. 63/499,743, filed May 3, 2023, Fini et al.
Aashto T 350-14, "Standard Method of Test for Multiple Stress Creep Recovery (MSCR) Test of Asphalt Binder Using a Dynamic Shear Rheometer (DSR)," American Association of State and Highway Transportation Officials, 2014, 7 pages.
Ackley et al., "Application of natural zeolites in the purification and separation of gases," Microporous and Mesoporous Materials, 2003, 61(1-3):25-42.
Alvarez-Ayuso et al., "Purification of metal electroplating waste waters using zeolites," Water Research, 2003, 37(20):4855-4862.
ASTM D4402/D4402M-15, "Standard Test Method for Viscosity Determination of Asphalt at Elevated Temperatures Using a Rotational Viscometer," ASTM International, 2015, 4 pages.
ASTM D6373-16, "Standard Specification for Performance Graded Asphalt Binder," ASTM International, 2016, 6 pages.
ASTM D6648-08, "Standard Test Method for Determining the Flexural Creep Stiffness of Asphalt Binder Using the Bending Beam Rheometer (BBR)," ASTM International, 2016, 15 pages.
ASTM E1269-11, "Standard Test Method for Determining Specific Heat Capacity by Differential Scanning Calorimetry," ASTM International, 2018, 6 pages.
Ates et al., "Abatement of nitrous oxide over natural and iron modified natural zeolites," Applied Catalysis A: General, 2011, 407(1-2):67-75.
Bellussi et al., "Industrial applications of zeolite catalysis: production and uses of light olefins," Studies in Surface Science and Catalysis, 2005, 158:1201-1212.
Bonenfant et al., "Advances in principal factors influencing carbon dioxide adsorption on zeolites," Sci. Technol. Adv. Mater., 2008, 9(1):013007, 8 pages.
Canestrari et al., "Rheological properties of bituminous binders with synthetic wax," International Journal of Pavement Research and Technology, 2013, 6(1):15-21.
Capitão et al., "Pavement engineering materials: Review on the use of warm-mix asphalt," Construction and Building Materials, 2012, 36:1016-1024.
Castaldi et al., "Sorption processes and XRD analysis of a natural zeolite exchanged with Pb2+, Cd2+ and Zn2+ cations," Journal of Hazardous Materials, 2008, 156(1-3):428-434.
Chen et al., "Exploratory synthesis of low-silica nanozeolites through geopolymer chemistry," Crystal Growth & Design, 2019, 19(2):1167-1171.
Chen et al., "Silver-Ion-Exchanged Nanostructured Zeolite X as Antibacterial Agent with Superior Ion Release Kinetics and Efficacy against Methicillin-Resistant *Staphylococcus aureus*," ACS Appl. Mater. Interface, 2017, 9(45):39271-39282.
Chen et al., "Template-free synthesis and structural evolution of discrete hydroxycancrinite zeolite nanorods from high-concentration hydrogels," Nanoscale, 2017, 9(47):18804-18811.

(Continued)

*Primary Examiner* — Ling Siu Choi
*Assistant Examiner* — Ronald Grinsted
(74) *Attorney, Agent, or Firm* — Fish & Richardson P.C.

(57) ABSTRACT

A modified bitumen includes bitumen and a bitumen modifier. The bitumen modifier includes composite particles. The composite particles include aluminosilicate nanostructures defining nanopores and micropores and paraffin wax adhered to surfaces of the aluminosilicate nanostructures. Modifying bitumen includes combining bitumen and the bitumen modifier.

17 Claims, No Drawings

(56) References Cited

OTHER PUBLICATIONS

Chhabra, "Non-Newtonian fluids: an introduction," Rheology of Complex Fluids, 2010, 33 pages.

Choi et al., "Stable single-unit-cell nanosheets of zeolite MFI as active and long-lived catalysts," Nature, 2009, 461(7261):246-250.

Chung et al., "Removal of free fatty acid in waste frying oil by esterification with methanol on zeolite catalysts," Bioresource Technology, 2008, 99(16):7438-7443.

Clark et al., "First principles methods using CASTEP," Zeitschrift für Kristallographie-Crystalline Materials, 2005, 220(5/6):567-570.

Crabtree et al., "Simulation of the Adsorption and Transport of CO2 on Faujasite Surfaces," J. Phys. Chem. C, 2013, 117(42):21778-21787.

Croteau et al., "Warm mix asphalt paving technologies: a road builder's perspective," Proc., Annual Conference of the Transportation Association of Canada, 2008, 12 pages.

Davis, "New perspectives on basic zeolites as catalysts and catalyst supports," Journal of Catalysis, 2003, 216(1-2):396-405.

Delley, "An all-electron numerical method for solving the local density functional for polyatomic molecules," J. Chem. Phys., 1990, 92(1):508-517.

Delley, "From molecules to solids with the DMol3 approach," J. Chem. Phys., 2000, 113(18):7756-7764.

Edwards et al., "Rheological effects of commercial waxes and polyphosphoric acid in bitumen 160/220—low temperature performance," Fuel, 2006, 85(7-8):989-997.

Edwards et al., "Rheological effects of waxes in bitumen," Energy & Fuels, 2003, 17(3):511-520.

Fini et al., "Active Mineral Fillers Arrest Migrations of Alkane Acids to the Interface of Bitumen and Siliceous Surfaces," ACS Sustainable Chemistry & Engineering, 2019, 7(12):10340-10348.

First et al., "Discovery of novel zeolites for natural gas purification through combined material screening and process optimization," AIChE Journal, 2014, 60(5):1767-1785.

Frising et al., "Extraframework cation distributions in X and Y faujasite zeolites: A review," Microporous and Mesoporous Materials, 2008, 114(1-3):27-63.

Grimme, "Density functional theory with London dispersion corrections," Wiley Interdisciplinary Reviews: Computational Molecular Science, 2011, 1(2):211-228.

Hashimoto, "Zeolite photochemistry: impact of zeolites on photochemistry and feedback from photochemistry to zeolite science," Journal of Photochemistry and Photobiology C: Photochemistry Reviews, 2003, 4(1):19-49.

Hosseinnezhad et al., "Multiscale Evaluation of Moisture Susceptibility of Biomodified Bitumen," ACS Applied Bio Materials, 2019, 2(12):5779-5789.

Hung et al., "Effects of water exposure on bitumen surface microstructure," Construction and Building Materials, 2017, 135:682-688.

Hung et al., "Intermolecular interactions of isolated bio-oil compounds and their effect on bitumen interfaces," ACS Sustainable Chemistry & Engineering, 2017, 5(9):7920-7931.

Hung et al., "Preventing Assembly and Crystallization of Alkane Acids at the Silica-Bitumen Interface to Enhance Interfacial Resistance to Moisture Damage," Industrial & Engineering Chemistry Research, 2019, 58(47):21542-21552.

Kalló, "Applications of natural zeolites in water and wastewater treatment," Reviews in mineralogy and geochemistry, 2001, 45(1), 519-550.

Khalid et al., Removal of phenol from water by adsorption using zeolites. Industrial & Engineering Chemistry Research 2004, 43(17), 5275-5280.

Langmi et al., Hydrogen adsorption in zeolites A, X, Y and RHO. Journal of Alloys and Compounds 2003, 356, 710-715.

Leinonen et al., Purification of metal finishing waste waters with zeolites and activated carbons. Waste management & research 2001, 19(1), 45-57.

Lu et al., (2007). "Effect of bitumen wax on asphalt mixture performance." Construction and building materials, 21(11), 1961-1970.

McCusker et al., Nomenclature of structural and compositional characteristics of ordered microporous and mesoporous materials with inorganic hosts (IUPAC Recommendations 2001). Pure and Applied Chemistry 2001, 73(2), 381-394.

Menapace et al., (2018). "Effect of recycling agents in recycled asphalt binders observed with microstructural and rheological tests." Construction and Building Materials, 158, 61-74.

Mintova et al., (2015). "Nanosized microporous crystals: emerging applications." Chemical Society Reviews, 44(20), 7207-7233.

Moshoeshoe et al., A review of the chemistry, structure, properties and applications of zeolites. Am. J. Mater. Sci 2017, 7(5), 196-221.

Mousavi et al., Underlying Molecular Interactions between Sodium Montmorillonite Clay and Acidic Bitumen. The Journal of Physical Chemistry C, 2019, 123:15513-15522.

Musser et al., (1998). "Molecular characterization of wax isolated from a variety of crude oils." Energy & Fuels, 12(4), 715-725.

Naber et al., Industrial applications of zeolite catalysis. In Studies in surface science and catalysis, Elsevier: 1994; vol. 84, pp. 2197-2219.

Newsam, The zeolite cage structure. Science 1986, 231(4742), 1093-1099.

Oldham et al., (2019). "Durability of bio-modified recycled asphalt shingles exposed to oxidation aging and extended sub-zero conditioning." Construction and Building Materials, 208, 543-553.

Pahlavan et al., Investigating molecular interactions and surface morphology of wax-doped asphaltenes. Physical Chemistry Chemical Physics 2016, 18(13), 8840-8854.

Pavelić et al., Natural zeolite clinoptilolite: new adjuvant in anticancer therapy. Journal of molecular medicine 2001, 78(12), 708-720.

Payne et al., Iterative minimization techniques for ab initio total-energy calculations: molecular dynamics and conjugate gradients. Reviews of modern physics 1992, 64(4), 1045-1097.

Perdew et al., Generalized gradient approximation made simple. Physical review letters 1996, 77(18), 3865-3868.

Porcher et al., The crystal structure of a low-silica dehydrated NaX zeolite. European journal of mineralogy 1999, 11:333-344.

Putranti et al., Adsorption of Free Fatty Acid (FFA) in Low-Grade Cooking Oil Used Activated Natural Zeolite as Adsorbent, IOP Conference Series: Materials Science and Engineering, TOP Publishing: 2018; 299:012085, 9 pages.

Rathod et al., (2014). "Experimental investigations on latent heat storage unit using paraffin wax as phase change material." Experimental Heat Transfer, 27(1), 40-55.

Roque-Malherbe, Complementary approach to the volume filling theory of adsorption in zeolites. Microporous and Mesoporous Materials 2000, 41(1-3), 227-240.

Rouquerol et al., Recommendations for the characterization of porous solids (Technical Report). Pure and Applied Chemistry 1994, 66(8), 1739-1758.

Rubio et al., Warm mix asphalt: an overview. Journal of Cleaner Production 2012, 24, 76-84.

Samieadel et al., (2017). "Multi-scale characterization of the effect of wax on intermolecular interactions in asphalt binder." Construction and Building Materials, 157, 1163-1172.

Samieadel et al., (2018). "Examining the Implications of Wax-Based Additives on the Sustainability of Construction Practices: Multiscale Characterization of Wax-Doped Aged Asphalt Binder." ACS Sustainable Chemistry & Engineering, 7(3), 2943-2954.

Samieadel et al., (2018). "Investigating molecular conformation and packing of oxidized asphaltene molecules in presence of paraffin wax." Fuel, 220, 503-512.

Savage et al., Nanomaterials and water purification: opportunities and challenges. Journal of Nanoparticle Research 2005, 7(4-5), 331-342.

Slough et al., "High precision heat capacity measurements of metals by modulated DSC." In Proc NATAS Annu Conf Therm Anal Appl, 2006, 34:160, 6 pages.

(56) References Cited

OTHER PUBLICATIONS

Soenen et al., (2014). "Laboratory investigation of bitumen based on round robin DSC and AFM tests." Materials and Structures, 47(7), 1205-1220.
Sun et al., (1994). "An ab initio CFF93 all-atom force field for polycarbonates." Journal of the American Chemical Society, 116(7), 2978-2987.
Tutu et al., Warm-mix asphalt and pavement sustainability: A review. Open Journal of Civil Engineering 2016, 6(02), 84-93.
Vanderbilt, Soft self-consistent pseudopotentials in a generalized eigenvalue formalism. Physical Review B 1990, 41(11), 7892-7895.
Williams et al., (1955). "The temperature dependence of relaxation mechanisms in amorphous polymers and other glass-forming liquids." Journal of the American Chemical society, 77(14), 3701-3707.
Woszuk et al., A review of the application of zeolite materials in warm mix asphalt technologies. Applied Sciences 2017, 7(3), 293, 15 pages.
Xu et al., (2019). "Evaluation and optimization of VPSA processes with nanostructured zeolite NaX for post-combustion $CO_2$ capture." Chemical Engineering Journal, 371:693-705.
Yilmaz et al., Catalytic applications of zeolites in chemical industry. Topics in Catalysis 2009, 52(6-7), 888-895.

\* cited by examiner

NANOSTRUCTURED ALUMINOSILICATE WAX CARRIER FOR ASPHALT

CROSS-REFERENCE TO RELATED APPLICATION

This application claims the benefit of U.S. Patent Application No. 63/004,243 entitled "NANOSTRUCTURED ALUMINOSILICATE WAX CARRIER FOR ASPHALT" and filed on Apr. 2, 2020, which is incorporated by reference herein in its entirety.

STATEMENT OF GOVERNMENT INTEREST

This invention was made with government support under 1928795 awarded by the National Science Foundation. The government has certain rights in this invention.

TECHNICAL FIELD

This invention relates to a warm-mix hybrid additive for asphalt. The hybrid additive, which includes a nanostructured zeolite impregnated with wax, releases wax to an asphalt mixture and also scavenges acid from the asphalt.

BACKGROUND

Paraffin wax has been used as a warm-mix additive for asphalt to improve the workability of bitumen and to extend the construction season. The addition of paraffin wax to asphalt reduces energy consumption and carbon footprint by reducing mixing and compaction temperatures of asphalt. Paraffin wax can also reduce the extent of oxidation aging of bitumen due to lower temperatures during the mixing and compaction stages. However, the presence of paraffin wax and its crystallization behavior can form weak spots in the bulk of bitumen, leading to cracks at low temperature.

SUMMARY

A hybrid additive for warm-mix asphalt (WMA) is described. The hybrid additive is made by a process that includes impregnating a nanostructured aluminosilicate (e.g., a porous nano-zeolite) with paraffin wax. The porous nano-zeolite facilitates impregnation with wax. The hybrid additive improves the workability of bitumen during mixing and compaction by promoting slow release of the paraffin and subsequent uniform distribution of wax in the asphalt, thereby allowing reduction of mixing and compaction temperatures. The hybrid additive also works as an adsorbent to scavenge acidic compounds from asphalt, thereby improving the durability of the asphalt.

In a first general aspect, a modified bitumen includes bitumen and composite particles. The composite particles include aluminosilicate nanostructures defining nanopores and micropores and paraffin wax adhered to surfaces of the aluminosilicate nanostructures.

Implementations of the first general aspect may include one or more of the following features.

A total amount of paraffin wax in the modified bitumen includes the paraffin wax adhered to the surfaces of the aluminosilicate nanostructures and an additional amount of paraffin wax, and ranges from 0.1 wt % to 10 wt % or 1 wt % to 10 wt % of the weight of the bitumen and the composite particles.

In some cases, the aluminosilicate nanostructures include nano-zeolite particles. In certain cases, the aluminosilicate nanostructures include zeolite nanorods. The aluminosilicate nanostructures can adsorb or neutralize acid. The aluminosilicate nanostructures can emit water. The surfaces can include interior or exterior surfaces of the aluminosilicate nanostructures. The paraffin wax can be impregnated in the nanopores and micropores of the aluminosilicate nanostructures.

The modified bitumen, when heated, releases the paraffin wax from the nanopores and micropores to yield paraffin wax in the bitumen and locations vacated by the paraffin wax. The paraffin wax in the bitumen is crystallized in the bitumen. The locations vacated by the paraffin wax adsorb organic acids in the bitumen.

In a second general aspect, modifying bitumen includes combining bitumen and a multiplicity of the composite particles of the first general aspect.

Implementations of the second general aspect may include one or more of the following features.

The paraffin wax is typically impregnated in the nanopores and the micropores of the aluminosilicate nanostructures. Combining the bitumen and the multiplicity of the composite particles releases a portion of the paraffin wax from the composite particles.

In a third general aspect, forming a bitumen modifier includes heating aluminosilicate nanostructures defining nanopores and micropores, contacting the aluminosilicate nanostructures with melted paraffin wax, and solidifying the paraffin wax, thereby adhering the paraffin wax to surfaces of the aluminosilicate nanostructures.

Implementations of the third general aspect may include one or more of the following features.

Forming a bitumen modifier typically includes impregnating the aluminosilicate nanostructures with the melted paraffin wax.

In a fourth general aspect, a bitumen modifier includes the composite particles of the first general aspect.

Implementations of the fourth general aspect may include one or more of the following features.

The paraffin wax is typically impregnated in the nanopores and the micropores of the aluminosilicate nanostructures. The aluminosilicate nanostructures can include nano-zeolite particles, zeolite nanorods, or both.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

A hybrid additive for warm-mix asphalt (WMA) is described ("Winz"). The hybrid additive is made by a process that includes impregnating a nanostructured aluminosilicate (e.g., a porous nano-zeolite or zeolite nanorods) with paraffin wax. Blending the hybrid additive into bitumen decreases crystallization of paraffin wax in the bulk of bitumen and improves bitumen cohesion and moisture and rutting (i.e., permanent deformation of asphalt pavement surface) performance in asphalt. In some implementations, the hybrid additive is combined with bitumen to achieve a weight percentage of the paraffin wax in a range of about 1 wt % to about 10 wt %. After blending the hybrid additive with bitumen, wax molecules are released to the bitumen, as evidenced by a reduction in the bitumen's viscosity. At low temperatures, bitumen containing the hybrid additive allows a release of stress, thereby leading to improved asphalt crack resistance. This indicates reduced crystallization of wax compounds, which may be attributed to a more uniform distribution enabled by the slow release of wax by the hybrid additive. The interactions of wax and the surface of nano-zeolite and the preferential adsorption of carboxylic acids onto the nano-zeolite surface suggests that paraffin wax interacts with nano-zeolite in the absence of acid. The introduction of acid is believed to lead to replacement of wax molecules with the acid, with the nano-zeolite acting as an adsorbent for acidic compounds in bitumen.

The term "wax" typically refers to a material that is a white solid at ambient temperature and melts at higher temperature to form a low-viscosity liquid. Bitumen contains a fraction of wax that can affect the rheological properties of the bitumen. Besides the natural wax in bitumen, adding wax to bitumen lowers the mixing and compaction temperature of asphalt by 20 to 40° C., which helps to reduce energy consumption and extend the construction season. This type of asphalt, which maintains lower viscosity at lower temperatures, is known as warm-mix asphalt (WMA).

Two waxes commonly recognized in crude oils and distillates are paraffin waxes and microcrystalline waxes. Paraffin waxes are mainly composed of n-paraffins (n-alkanes), with minor amounts of isoparaffins and cycloparaffins. Paraffin waxes crystallize as plates or needles, and their melting points are in the range of 50 to 70° C.; their melting points are reduced to 20-30° C. when blended with bitumen. Microcrystalline waxes are aliphatic hydrocarbon compounds containing a considerable amount of isoparaffins and cycloparaffins. Microcrystalline waxes have a less distinct melting point and a high average molecular weight.

Nano-zeolites are the nanocrystalline form of zeolites, which are a type of nanoporous (pore size <2 nm) crystalline aluminosilicate material. Compared to conventional micron-sized zeolites, nano-zeolites have improved external surface area due to the reduction of size to nanoscale, and also have additional inter-particle meso-pores (2-50 nm) and small macro-pores (50-200 nm). As described herein, nano-zeolites can be used advantageously as a carrier for large paraffin molecules due at least in part to the large external surface area and large pore volume. Synthetic zeolite is prepared through dissolving a high volume of amorphous aluminosilicate solid particles in an alkaline solution. This synthetic zeolite contains nano-zeolites with different crystal structures including Faujasite, Cancrinite, Sodalite (with a crystalline size smaller than 40 nm) and a submicron-sized Linde-type A zeolite. Zeolites having pore sizes of less than 2 nm are introduced as the microporous materials; based on the IUPAC definition, materials having pore sizes of 2-50 nm are mesoporous, and those having pore sizes larger than 50 nm are macroporous materials. Nanopores are defined as pores having a pore diameter or pore width in the range between 1 and 100 nm.

Nano-zeolites impregnated with paraffin wax molecules are used as a warm-mix additive to make paraffin wax more dispersed in the bulk of asphalt. Nano-zeolite has a stiffening effect, so once it is mixed with paraffin wax to modify bitumen, it is capable of counteracting the softening effect of paraffin wax at higher intermediate temperature and reducing the susceptibility of wax-modified bitumen to rutting. Paraffin wax is melted and mixed with nano-zeolite prior to mixing with bitumen. Nano-zeolite pores are impregnated with melted paraffin wax to promote an isomerization process to better disperse paraffin wax and reduce the crystallization process. Furthermore, the agglomeration of nano-zeolite particles decreases, and nano-zeolite acts as a carrier for paraffin wax. As a result, wax molecules are released after combination of the hybrid additive with the bitumen, and the acidic part of bitumen is attracted to nano-zeolite, thereby improving of cohesion of bitumen. Furthermore, the adhesion of bitumen and stone aggregate becomes less susceptible to moisture damage.

Zeolites described herein function as a wax carrier and acid adsorbent, and demonstrate replacement of wax with unfavorable organic acids in bitumen. The selectivity of zeolites toward the polar or non-polar molecules depends on the zeolite's charge (extra-framework cations and framework Si/Al). While charged zeolites are hydrophilic materials, pure silica zeolites with no positive charge are highly hydrophobic. The low-silica synthetic zeolite provides polarity that allows interaction with polar groups such as organic acids. In terms of acid adsorption, zeolites including A-zeolite, X-, and Y-zeolites, and Mordenite have a capacity for accepting fatty acids such as heptanoic and oleic acids. Zeolites can also selectively eliminate the trans-unsaturated double bond fatty acids from a mixture of cis- and trans-isomers of fatty acid compounds.

Atomic force microscopy (AFM) provides a molecular-level insight into the adsorption behaviors of wax and organic acid in micropores of zeolite. AFM images of bitumen-silica (as a surrogate for siliceous stone) and bitumen-zeolite interfaces are collected. To enhance understanding of the molecular mechanism underlying the interactions between zeolite and wax or acid, in a comparative study, a series of quantum-based calculations are performed through a dispersion-corrected density functional theory (DFT-D) approach. The zeolite model used in DFT-D calculations is a Faujasite-type zeolite identified and characterized in the synthetic zeolite. Faujasite (zeolite X) is a basic zeolites, with its basicity ascribed to its Al content, generating a negative charged framework.

EXAMPLES

Example 1

Nano-zeolites were synthesized by first preparing an aluminosilicate precursor mixture with the composition of $2.5Na_2O: 1.0Al_2O_3: 4.0SiO_2: 33H_2O$. The mixture was prepared by dissolving 17.028 g of NaOH pellets (acquired from Sigma-Aldrich) and 55.046 g of water glass (also from Sigma-Aldrich) in deionized water (DI water) (35.498 g), followed by the addition of 27.473 g of metakaolin (MetaMax® from BASF, $SiO_2$: 53.0%, $Al_2O_3$: 43.8%, $Na_2O$: 0.23%, $K_2O$: 0.19%, $TiO_2$: 1.7%, and $Fe_2O_3$: 0.43%). After stirring with a mechanical mixer (IKA RW 60 digital mixer) at 800 rpm for 40 min, a visually homogeneous and free-flowing solution was obtained. The solution was then poured into 500-ml autoclavable polypropylene bottles, and the bottles were tightly closed and placed in a laboratory oven at 90° C. for 48 hours. After the heating, the products were taken out and washed with D.I. $H_2O$ multiple times until the pH of the supernatant was about 8. The final product was collected after centrifugation; then it was dried in a laboratory oven at 90° C. overnight and stored in sealed glass vials at room temperature for further use.

The bitumen used is graded as PG 64-22, which is commonly used in the United States; it was acquired through Western Asphalt Inc. in Arizona. The wax that was used for bitumen modification is a paraffin wax (P31, with melting point of 53-57° C., acquired from Fisher Scientific). The wax was introduced at 1%, 3%, and 5% dosage by weight of the initial asphalt binder and was blended into the asphalt binder at 135° C. for 30 minutes.

To impregnate the nano-zeolite with paraffin wax, the nano-zeolite was heated in the oven at 100° C. for two hours to reduce the moisture content as much as possible. Then the weighted nano-zeolite was placed in a glass container and put on a hot plate at 100° C. The wax granules were put around it to become liquid, then it was hand-blended until there was no remaining liquid paraffin wax. After impregnation, the nano-zeolite samples still existed as powder form, but some agglomerates were also observed. For further studies and uses, the samples were sieved by a 425 μm sieve. To prepare the hybrid-additive-modified bitumen, nano-zeolite powder and wax were placed on a hot plate. The nano-zeolite and melted wax were mixed with a spatula, and the resulting hybrid additive powder was saved for bitumen modification. The amount of hybrid additive was calculated based on the amount of wax to reach the same percentages of 1%, 3%, and 5% of bitumen. For instance, 2 g of hybrid additive was added to 20 g of bitumen to produce a 5% wax bitumen sample, since each gram of hybrid additive has equal portions of wax and nano-zeolites. To decouple the effect of impregnation, another sample called the "Control+5% Wax+5% NZ" sample was made similarly to the 5% wax sample, but the nano-zeolite and wax were added separately.

Scanning electron microscopy (SEM) images of hybrid additive samples and nano-zeolite samples were collected using an XL30 environmental FEG (FEI) microscope operating at 10 kV acceleration voltage. For SEM, the sample powders were sprinkled onto the SEM stub affixed with carbon conducting tape, and the samples were then coated with Au/Pt for ~6 nm before imaging. The coupled energy dispersive X-ray spectroscopy (EDS) analysis was performed at 20 kV and ~11 mm working distance.

Measurements of viscosity were conducted following ASTM D4402 (ASTM D4402 2015), using a Brookfield Viscometer RV-DVIII Ultra by applying a rotational shear on the selected material. Test specimens were prepared by pouring 10.5 grams into a specific aluminum chamber, then allowing it to cool to room temperature. Samples were preheated in an oven for 30 minutes before being placed into the temperature-controlled thermoset. After thermal equilibrium within the sample was reached, three viscosity readings were collected at three-minute intervals until the readings had a range of less than 100 cP (0.1 Pa*s). The average of these three numbers was recorded as apparent viscosity. The rotational speed chosen for this study was 20 rpm, with measurements conducted at 105° C., 120° C., 135° C., and 150° C.

A dynamic shear rheometer was used to investigate the elastic and viscous behavior of wax-modified asphalt binder by measuring the shear stress and shear strain, which was then used to calculate the complex modulus (G*) of the material. Complex modulus is typically defined as a measure of a binder's resistance to deformation when repeatedly sheared. In order to determine G*, a relatively wide range of oscillations were applied to the sample, ranging from 0.1 rad/s to 100 rad/s, at temperatures ranging from 76° C. to 4° C. at 6-degree intervals using 31 frequencies. From the resulting data, G* master curves were generated using the principle of time-temperature superposition at a reference temperature of 40° C. Shift factors were generated using the Williams, Landel, and Ferry (WLF) method (Williams et al. 1955). For temperatures from 70° ° C. to 40° C., the 25 mm spindle was used; for temperatures from 40° C. to 4° C., the 8 mm spindle was used. The frequency at which the graphs for elastic modulus and viscous modulus intersect is the crossover frequency of the specimen. The crossover temperature is the temperature at which the loss modulus and elastic modulus are equal.

To further investigate the change in particle size and the intermolecular interactions of wax and hybrid-additive-modified bitumen, a shear thinning test from 0.1 to 30 (1/s) was performed at 52° C. using an 8 mm parallel plate. This test reveals the thixotropic characteristics of bitumen, which is indicative of the intermolecular interaction in bitumen.

As the shear rate increases (>10 1/s), shear thinning occurs, and the data can be fitted to a power law model using Equation 1.

$$\sigma = K\dot{\gamma}^n \text{ and } \eta = K\dot{\gamma}^{n-1} \tag{1}$$

where $\eta$ is viscosity, $\dot{\gamma}$ is shear rate, $\sigma$ is shear stress, and n is the power law index. K is the flow consistency index, a measure of viscosity under non-Newtonian flow.

The multiple stress creep recovery (MSCR) test was performed following the AASHTO T350-1433 (AASHTO T 350-14 2014) specification, in which the binder is subjected to 10 cycles of stress and recovery of 1 and 9 s, respectively, at two stress levels of 0.1 and 3.2 kPa, at 58° C. Before the start of the test, samples were subjected to a preload cycle. Afterward, nonrecoverable creep compliance (known as Jnr) and the recovery difference between stresses of 0.1 and 3.2 kPa were determined.

Bitumen samples with 1%, 3%, and 5% of added wax along with the base bitumen and wax were tested to determine the heat capacity and glass transition temperature (Tg) and to illustrate the effect of wax and the method of impregnation of nano-zeolite with wax on the bitumen properties. The heat flow measurements were determined by the three-run method (ASTM E1269-11 2018), and the glass transition temperature (Tg) was determined in a second heating cycle. The three-run heat capacity approach uses an isothermal-ramp-isothermal DSC method. This method consists of empty pans, sample, and a reference material such as sapphire. A high heating rate of 20° C./min is used to provide good signal to noise that can't be achieved with slower heating rates. For this method, provisions need to be made to correct or compensate the data for differences in the mass of the sample pan and the reference pan. To minimize the effect of instrument drift, the isothermal segments are used. The empty pan baseline was subtracted from the reference results to determine a conversion factor of heat flow (mW) to heat capacity)(J/° ° C. Replicate heat capacity determinations using the three-run method typically agree within about 3% or less. The three-run method can be done on almost any differential scanning calorimeter with a minimal amount of instrument preparation. The test started at −80 and ended at 160° C. The samples (5-7 mg) were placed in Tzero aluminum pans with hermetic lids. The calculations of glass transition point and enthalpy associated with endothermic peaks were done using TRIOS software developed by TA Instruments.

The bending beam rheometer (BBR) test was used to characterize the mechanical performance of bitumen at subzero temperatures and to measure the stiffness and m-value of bitumen (ASTM D6648 2016). The M-value measures the ability of a bitumen beam sample (12.5 mm wide, 127 mm long, and 6.25 mm thick) to relax stress while a constant load of 980 mN is applied at the middle point of the beam. After applying the load, the deflection of the beam was measured, and the stiffness and the m-value were calculated at the 60-second point.

To meet the ASTM standard, a bitumen sample should have a stiffness lower than 300 MPa and an m-value higher than 0.3 at the test temperature specified for each PG grade (10° C. higher than the lower PG grade). In the case of PG 64-22, the test temperature is −12° C. BBR test results were used to calculate the temperature at which the stiffness is equal to 300 MPa and the m-value is equal to 0.3. The lower of the two temperatures is called the critical low temperature; the difference between the two temperatures ($\Delta T_c$) has been related to non-load-related cracking of asphalt pavement and the fatigue performance of pavement.

A molecular dynamics simulation was performed on a system at equilibrium state composed of three parts: a slab of silica ($SiO_2$) in crystal form with a separation of 80 Å, to represent nano-zeolite particles; wax molecules of $C_{11}H_{24}$; and decanoic acid, which is commonly found in the acidic part of bitumen. The acid-silica interaction in bitumen is due to the increase in moisture susceptibility of bitumen because of the presence of the acidic part. This increase is because of the hydrophilic nature of acids and the consequent interaction with water, which results in a reduction in the cohesion and adhesion properties of bitumen.

To investigate the interaction of silica-based structures with wax and acid, Large-scale Atomic/Molecular Massively Parallel Simulator (LAMMPS) software in a MedeA® environment version 2.2 was used for simulation. The study focused on investigating the interaction of wax and acid molecules with silica. The model was built in the MedeA® environment using the molecular builder. In this study, the PCFF+ force field, which is an extension of the PCFF force field, is used. The force field refers to the functional form of parameters used to calculate the potential and kinetic energy of the system of atoms and molecules. PCFF+ is an all-atom force field designed to provide excellent accuracy on hydrocarbon and liquid modeling for ab initio simulations. This force field includes a Lennard-Jones 9-6 potential for intermolecular and intramolecular interactions and specific stretching, bending, and torsion terms to involve 1-2, 1-3, and 1-4 interaction.

A slab of silica ($SiO_2$) was made using the MedeA interface with periodic boundary condition applied. The ensemble of wax molecules was simulated separately and then merged to the cell that includes the silica structure. The silica walls were separated by a distance of 80 Å, to simulate the nano-pores of nano-zeolite. Initially, the wax and silica were equilibrated in an NVT ensemble for 500 ps; then the decanoic acid molecules (at equilibrium state) were added to the system to study the interaction preferences of the three materials (wax, acid, and silica). The simulations started at a high temperature of 800K, annealing to 370K, which was selected as the target temperature.

The morphology of the 5% wax hybrid additive sample and its wax distribution were investigated by scanning electron microscopy (SEM). In the low-magnification SEM image, the particle sizes macroscopically are quite large and heterogeneous, ranging in size from a few μm up to 500 μm. Higher-magnification imaging reveals that each of those large particles consists of sub-micron-sized particles that agglomerate together. Those sub-micron-sized particles exhibit smooth surfaces and relatively uniform sizes in the range of 200-500 nm. The sizes of primary hybrid additive particles are consistent with those of pure nano-zeolites before wax impregnation. However, the pure nano-zeolites show surfaces that are much more textured. This confirms that in the hybrid additive samples, the nano-zeolites are impregnated by waxes, leading to the smooth surfaces. Notably, the majority of areas examined in the hybrid additive sample revealed a homogeneous distribution of smooth-surface wax-impregnated particles, without segregation of a region of pure wax. Nonetheless, small regions of pure wax were still observed, as shown in the SEM images and EDS results. This could be due to a limitation of the hand-blending method.

Viscosity was assessed for control samples and samples modified with either pure wax, wax-impregnated nano-zeolite (hybrid additive), or separately added nano-zeolite and wax. The results show that the addition of wax decreases the viscosity at all temperatures. Adding the hybrid additive also showed a softening effect on the control sample, but the binder became stiffer because of the presence of nano-zeolite particles. The addition of nano-zeolite and wax separately had the same effect as wax-impregnated nano-zeolite; this suggests that wax molecules are blended with bitumen, which shows the release of wax molecules from the nano-pores and meso-pores of nano-zeolite.

The complex modulus of bitumen modified with either wax, nano-zeolite impregnated with wax (hybrid additive), or separately added nano-zeolite and wax was assessed. Graphs were made using time-temperature superposition laws at a reference temperature of 40° C. The complex modulus at higher frequency shows lower values for the samples containing wax, which is an indication of softer binder at higher frequency or lower temperatures. The 5% hybrid additive sample is slightly stiffer than the control, which can be due to the presence of nano-zeolite particles. The results also show there is no difference in high temperature properties between adding nano-zeolite and wax separately and adding wax-impregnated nano-zeolite. The latter is an indication of wax being released when added via wax-impregnated nano-zeolite.

Storage and loss modulus were assessed, and Table 1 presents the values for crossover frequency and modulus at 13° C. Crossover frequency is a measure of stiffness: material with a higher value of crossover frequency has less molecular interaction, and material with smaller value of crossover frequency has higher molecular interaction. This result shows that as the wax amount increases in bitumen, the crossover frequency shifts to a lower value, with the exception of the 1% sample. A lower crossover frequency is an indication of stiffer material which is the result of crystallization of wax in the bulk of bitumen. Furthermore, the results show that when wax was introduced through nano-zeolite instead of being directly added to bitumen, the resulting sample showed a higher crossover frequency that can be due to presence of nano-zeolite particles leading to a more elastic material. However, the hybrid additive samples have a higher modulus at crossover frequency, showing a stiffer material. The sample with separately added wax and nano-zeolite has the same crossover frequency and modulus as bitumen modified with wax-impregnated nano-zeolite, which suggests there is minimal variation between adding wax-impregnated nano-zeolite and adding wax and nano-zeolite separately. This further shows that wax is quickly released from impregnated nano-zeolite after addition to bitumen sample.

TABLE 1

Crossover frequency results at reference temperature of 13° C.

| Sample | Crossover Frequency at 13° C. | Crossover Modulus (MPa) |
| --- | --- | --- |
| Control | 26.8 | 7.95 |
| Control + 1% Wax | 33.71 | 1.01 |
| Control + 3% Wax | 1.11 | 3.23 |

TABLE 1-continued

Crossover frequency results at reference temperature of 13° C.

| Sample | Crossover Frequency at 13° C. | Crossover Modulus (MPa) |
|---|---|---|
| Control + 5% Wax | 0.04 | 1.12 |
| Control + 1% Wax (hybrid additive) | 29.37 | 9.43 |
| Control + 3% Wax (hybrid additive) | 3.63 | 5.79 |
| Control + 5% Wax (hybrid additive) | 0.22 | 3.21 |
| Control + 5% Wax + 5% NZ (Added separately) | 0.13 | 3.21 |

From the complex modulus results, the values at 10 rad/s were determined and used to calculate the Superpave specification parameter as an indicator of the material's susceptibility to rutting, based on ASTM D6373-16 (ASTM D6373-16). The results (presented in Table 2) show that adding wax changes the grade of bitumen based on the limit of 1 kPa for G*/sin (8). However, when wax was added via nano-zeolite, stiffness and rutting resistance parameters increased. The latter effect is an improvement for rutting performance of bitumen modified with wax. Adding wax and nano-zeolite separately (Control+5% Wax+5% NZ) or as wax-impregnated nano-zeolite (hybrid additive) appeared to be nearly the same in terms of rutting performance.

TABLE 2

High service temperature test results of G*/sin(δ)

| Sample | G*/sin(δ) (Pa) | | | | | Criterion | High-temperature grade |
|---|---|---|---|---|---|---|---|
| | 52 | 58 | 64 | 70 | 76 | | |
| Control | 8821 | 3592.7 | 1570.6 | 736.9 | 367.45 | >1000 | 64 |
| Control + 1% Wax | 7430.6 | 2523.6 | 1129.4 | 541.66 | 276.72 | | 64 |
| Control + 3% Wax | 3300.6 | 1431.3 | 664.5 | 328.8 | 173 | | 58 |
| Control + 5% Wax | 2077.2 | 920.6 | 439.84 | 222.71 | 120.45 | | 52 |
| Control + 1% Wax (hybrid additive) | 6413.9 | 2675.9 | 1194 | 571.93 | 291.31 | | 64 |
| Control + 3% Wax (hybrid additive) | 3793.5 | 1644.4 | 757.86 | 374.81 | 196.71 | | 58 |
| Control + 5% Wax (hybrid additive) | 2440.7 | 1073.8 | 514.94 | 263.29 | 142.69 | | 58 |
| Control + 5% Wax + 5% NZ | 2202.7 | 955.85 | 446.16 | 224.49 | 121.8 | | 64 |

To investigate the effect of moisture on internal structure of binder modified with hybrid additive, a sample of 5% wax (hybrid additive) was conditioned in water for 24 hours at a temperature of 60° C. After conditioning the shear thinning behavior of both samples were studied to illustrate the effect of moisture on internal molecular interaction of modified sample. Shear thinning behavior of dry and wet conditioned samples of 5% Wax (hybrid additive) modified binder was assessed. The power law parameters calculated from Equation 1 for the shear thinning part of the graph are presented in Table 3. The results show that after water conditioning, the internal forces in hybrid additive modified sample are weakened, leading to a lower onset frequency of shear thinning with a lower power law index. This phenomenon can be due to change of interactions after water exposure and dissolving acidic portion of bitumen, resulting in a lower intermolecular bonding.

TABLE 3

Power law parameters of shear thinning in wet and dry conditions

| Sample | Temperature ° C. | Power law index (n) | Consistency parameter (K) |
|---|---|---|---|
| Control + 5% Wax (hybrid additive)-Dry | 60 | −3.251 | 9.0E+08 |
| Control + 5% Wax (hybrid additive)-Wet | 60 | −1.89 | 1.0E+07 |

The results for the MSCR test at 58° C. are shown in Table 4. The non-recoverable creep compliance (Jnr) is higher for samples with higher percentages of wax, indicating that bitumen samples show less recovery at higher service temperatures with higher percentages of wax. However, samples modified with hybrid additive have a lower Jnr at both 0.1 and 3.2 kPa. The higher values of $Jnr_{diff}$ for hybrid additive samples show that when nano-zeolite particles are present, non-recoverable compliance changes more with an increase in stress level.

TABLE 4

Multiple stress creep recovery test results at 58° C.

| Samples | Jnr 0.1 | Jnr 3.2 | Jnr diff (%) |
|---|---|---|---|
| Control | 2.69 | 2.99 | 11.13 |
| 1% wax | 3.60 | 4.05 | 12.65 |
| 3% wax | 7.01 | 7.78 | 10.91 |
| 5% wax | 10.91 | 12.24 | 12.25 |
| 1% Wax (hybrid additive) | 3.48 | 3.93 | 12.64 |
| 3% Wax (hybrid additive) | 6.21 | 7.03 | 13.1 |
| 5% Wax (hybrid additive) | 9.38 | 10.84 | 15.57 |

Table 5 shows the results from differential scanning calorimetry. After the addition of wax, the glass transition temperature didn't change dramatically, with an exception of 5% (hybrid additive) sample. On the other hand, the melting peak temperature shows a reduction for hybrid additive samples compared to that of wax samples. This phenomenon can be due to presence of nano-zeolite particles and their lower thermal capacity, which results in more heat absorbance and hence, faster melting of wax at lower temperatures.

TABLE 5

Thermal properties of control and modified bitumen samples

| Sample | Onset glass transition (° C.) | Glass transition midpoint(° C.) | End point of glass transition (° C.) | Onset melting temperature (° C.) | Peak melting temperature (° C.) | Enthalpy of melting (J/g) |
|---|---|---|---|---|---|---|
| Control | −43.2 | −28.82 | −11.7 | 6.51 | 17.69 | 1.12 |
| Control + 3% wax | −38.28 | −28.27 | −18.05 | 19.38 | 36.11 | 3.62 |
| Control + 3% Wax (hybrid additive) | −38.87 | −28.59 | −18.12 | 17.26 | 34.28 | 4.27 |
| Control + 5% Wax | −42.91 | −29.83 | −15.58 | 16.17 | 36.15 | 5.37 |
| Control + 5% Wax (hybrid additive) | −43.67 | −26.67 | −5.6 | 14.21 | 35.6 | 8.99 |

Stiffness and m-value were assessed for different samples at −12° C. To be able to decouple the results, a control sample was also prepared by adding separately the same amounts of wax and nano-zeolite as in the hybrid additive samples, to investigate whether impregnation makes a difference. As the results illustrate, the addition of wax increases the stiffness and reduces the m-value at subzero temperatures. However, the addition of wax in the form of impregnated nano-zeolite particles reduced the stiffness and increased the m-value at the same time. Furthermore, modifying the bitumen by adding the wax and nano-zeolite separately also resulted in approximately the same values for stiffness and m-value. The results suggest that the presence of nano-zeolite is the most effective factor on stiffness and m-value. In the presence of nano-zeolite, there was little difference between impregnating the wax and just adding the wax separately.

To assess the effect of modification on critical low temperatures (the temperature where the material meets the standard criteria), data from at least two points need to be acquired. The second temperature was selected as −18° C. The measures of the difference between the critical low temperatures ($T_{stiffness}-T_{m-value}$) for control, control+5% wax, control+5% Winz, and control+5% wax+5% NZ are −1.25, −8.64, −8.5, and −8.94° C., respectively, were assessed. The results show that the addition of nano-zeolite particles lowers the stiffness and increases the m-value at both −18° C. and −12° C. This in turn indicates improved stress relaxation capacity in the case of Winz, where wax is carried within nano-zeolite. This can be attributed to reduced stacking and crystallization of wax in bitumen due to enhance dispersion enabled by nano-zeolite. This was also evidenced in higher value of delta Tc for samples where wax was directly added to bitumen.

The MD results show that at NVT ensemble, the wax molecules are attracted by active sites of the silica structure.

The initial ensemble for the second stage of the simulation, which starts with the addition of a droplet of acid to the wax-silica system, was assessed. After 500 ps of simulation, the final ensemble suggests that acid molecules replace wax on the surface of silica and also occupy the vacant active sites of a silica crystal. This phenomenon results in the release of wax, which was shown in the results of experiments. Absorbing the acid from bitumen can improve the moisture susceptibility of pavement.

Thus, a method for blending paraffin wax with bitumen was described. Advantages of this method include reduction of the adverse effects of wax on the low-temperature properties of bitumen due to wax crystallization, which is an underlying cause for the stiffening effect and embrittlement at low temperatures of bitumen-containing wax. Impregnating the wax in the nano-pores of made nano-zeolite showed effects that can be related to a reduction of wax crystals.

SEM images confirmed that the nano-zeolites were impregnated by paraffin waxes in hybrid additive samples, and the hybrid additive samples showed a homogeneous distribution of wax-impregnated particles with a minimal number of segregated regions of pure wax.

The crossover frequency was shown to be higher for bitumen containing hybrid additive than for isolated paraffin wax, indicating lower intermolecular forces; this can be a result of prevention of wax crystals at a lower service temperature of bitumen. At higher service temperatures of bitumen, bitumen modified with wax-impregnated nano-zeolite showed the same softening effect as wax-modified samples and additionally showed better rutting performance than that of isolated wax-modified samples. The presence of nano-zeolite particles reduced the rutting susceptibility of bitumen.

Shear thinning behavior of hybrid additive modified binder in dry and wet condition showed that nano-zeolite powder can play an adsorbent role for acidic part of bitumen. This can improve bitumen cohesion.

Study of the thermal properties of samples showed that the hybrid additive samples had a lower peak melting temperature, and the enthalpy of melting increased at the same time. This could indicate a larger number of wax crystals, which would cause a larger surface area.

The stiffness and m-value of bitumen showed improvement in both scenarios: adding hybrid additive, and separately adding wax and nano-zeolite. Compared to wax-modified samples, this improvement can be due to the addition of nano-zeolite particles, which can improve the elastic response of the material and consequently improve the m-value results. Both hybrid additive and separately added wax and nano-zeolite had a reduction effect on stiffness, which can be from the nano-zeolite alone. The hardness of nano-zeolite is not expected to change much with a decrease in temperature.

The molecular dynamics simulation results show that the silica-like structures are likely to absorb wax molecules at high temperature. However, this interaction will swing towards more active molecules such as carboxylic acids. Absorbance of acid by nano-zeolite is thought to be reflected in shear thinning behavior of modified bitumen. In addition, trapping acids in pores of zeolite could detract acids from the interface of bitumen and stone aggregate, reducing the moisture susceptibility of asphalt mixture.

Example 2

PG 58-28 petroleum bitumen was acquired from Associated Asphalt through Sharpe Brothers in Greensboro, NC. The bitumen was produced from the Philips 66 Wood River refinery in Roxana, IL, which receives primarily Canadian and U.S. crude oils. Acetone, isopropanol, and toluene (ACS grade) were obtained from Fisher Scientific. Hexadecanoic acid (HDA, 98%) and paraffin wax were also obtained from Fisher Scientific. Hydroxycancrinite zeolite nanorods were synthesized from hydrothermal treatment of high-concentration aluminosilicate hydrogels. The nanorods were typically 200-800 nm long and 30-50 nm wide.

To evaluate the efficacy of wax-impregnated zeolite to release wax to bitumen and adsorb acidic compounds from bitumen atomic force microscopy was used to collect images of bitumen-silica (as a surrogate for siliceous stone) and bitumen-zeolite interfaces; following section describes sample preparation and analysis method.

Bitumen-filled capillary tubes were prepared. To do so, long-stem glass Pasteur pipettes (soda-lime glass, Fisher Scientific) were first cleaned by sequential ultrasonication for 10 min each in acetone, then isopropanol, then deionized (DI) water. The pipettes were dried with an argon gas gun followed by at least 30 min of baking at 120° C. on a hotplate to drive off residual water.

Bitumen mixtures were doped with 1 wt % of HDA as a model for acid-rich, moisture susceptible binder. To study the effect of zeolite nanorods on migration of HDA to the mineral interface, 2 wt % of pristine zeolite was introduced to HDA-doped bitumen followed by hand-mixing for 10 min at roughly 120° C. As a comparison scenario, 4 wt % of wax-impregnated zeolite (containing 2 wt % zeolite and 2 wt % wax) was introduced to HDA-doped bitumen. Wax-impregnated zeolite was prepare by mixing wax and zeolite in a 1:1 ratio by weight in a dish on a hotplate at 80° C. Immediately after introducing nano-particles, the molten bitumen was sucked up the capillary stem of a pipette. Excess bitumen on the outside of the tube was cleaned off with laboratory tissues and acetone. The bitumen-filled glass capillary tube was broken off the pipette for easier handling and annealed at 120° C. for 10 min on a hotplate.

To image the internal microstructure of the bitumen samples by atomic force microscopy (AFM), a short segment of the tube was snapped off to expose a fracture surface that revealed a cross-section of the bitumen-filled capillary tube. The segments were examined under a low-magnification optical microscope to determine if the fracture was successful in yielding areas smooth enough for AFM imaging; fracturing was repeated until smooth enough area was obtained. The segment was then mounted in a vertical sample holder and imaged by AFM.

AFM imaging was performed on a NanoIR3 AFM (Bruker Nano/Anasys Instruments). Standard tapping mode rectangular cantilever silicon probes were used for imaging (PR-EX-T125, 40 N/m nominal stiffness, 300 kHz nominal frequency, Bruker Nano/Anasys Instruments). The images were processed using Gwyddion open source software.

The crystal structure of zeolite is characterized by the primary building blocks containing $(SiO_4)^{4+}$ and $(AlO_4)^{5+}$ tetrahedron units linked to each other by the oxygen atoms to form open cavities in the form of channels and cages. The channels (supercages) and cages formed are usually occupied by the exchangeable cations and water molecules. The crystal structure of Faujasite-type zeolite (zeolite X and Y) contains the sodalite cages (B-cages, with 6.3 Å diameter) linked to one another through hexagonal prisms (double 6-rings) to form 3-dimensional pores of nearly spherical supercages, which are characterized by a rather large inner cavity of about 12 Å diameter composed of 10 sodalities; the access to the supercages and also smaller cages (sodalites) are performed through 12-oxygen ring opening windows having a free diameter of 7.4 Å. Faujasite zeolites are commonly categorized into Faujasite-X with the ratio of Si/Al=1-1.5 and Faujasite-Y with the ratio of Si/Al=1.5-2. The higher content of silica in zeolite Y provide higher thermal stability for the zeolite.

The initial geometry of Faujasite-Na unit cell used in this study was derived from the structural and crystal-chemical features presented by Lecomte et al. (The crystal structure of a low-silica dehydrated NaX zeolite. European journal of mineralogy 1999, 333-344) reported in AMCSD (american mineralogist crystal structure database) with the database code 0006772 information. This unit cell with the chemical formula of $Na_{256}Al_{96}Si_{96}O_{384}$ includes the cell length parameters a=b=c=25.10 Å, and cell angles $\alpha=\beta=\gamma=90°$. The ratio of Na:Al:Si=2.7:1:1 in this low-silica dehydrated zeolite was changed to Na:Al:Si=2.5:1:2 to simulate the chemical composition of its synthetic analogue in the present study. The newly formed cell has fewer Na cations, resulting from the decrease in the Al content, leading to a reduced polarity in the supercage network compared to the high Al content zeolite. A primitive unit cell of Faujasite-Na can have a chemical formula of $Na_{40}Al_{16}Si_{32}O_{96}$. The surface model of Faujasite (111) and the corresponding slab model, with 20 Å vacuum, were provided from the primitive unit cell. The periodic slab was then fully optimized to be used in next step (making cluster models).

Using the DFT plane-wave pseudopotential method, the periodic slab calculations were performed through CASTEP, implemented in Accelrys Materials Studios program package version 6. In the framework of generalized gradient approximation (GGA), PBE (Perdew-Burke-Ernzerhof) was used as the exchange-correlation functional, and Grimme's correction was included to the GGA approximation to include the long-range dispersion correction to generate a general functional termed PBE-D. Under the chosen kinetic-energy cut-off (330 eV) and k-point (1×1×1), the overall quality for the numerical integrations was set to "medium" grid. A full atomic position optimization was performed under ultrasoft pseudopotential with the convergence criteria of $2.0 \times 10^{-5}$ eV/atom, $5 \times 10^{-2}$ eV/Å, $1 \times 10^{-1}$ GPa, and $2 \times 10^{-3}$ Å for energy, maximum force, stress, and displacement, respectively.

The cluster approach was adopted to describe the performance of wax and acid molecules within the Faujasite cavities. To do so, cluster models of the Faujasite surface were isolated from the corresponding fully optimized slabs made in periodic boundary condition (PBC) approach. The clusters isolated include an entrance window of supercage, characterized by a 12-membered ring, called "supercage window cluster", and a sodalite cage surrounded by three hexagonal prisms, called "small cage cluster". In a supercage window cluster, the broken bonds at the boundaries were saturated with H for O atoms, and OH for Al and Si. In a small cage cluster, the broken bonds are in the lower layers and not directly involved in interactions, so all them were fastened with the H atoms.

All DFT calculations pertaining to clusters were performed via a non-periodic DMol$^3$ module implemented in the Accelrys Materials Studio program package (version 6.0). As for the PBC approach described above, the PBE density functional, at the framework of GGA combined with Grimme's long-range dispersion correction (PBE-D), was employed as the exchange functional. All-electron double numerical basis sets (DND) were defined for the optimization process. At the level of integration, the tolerances for energy, maximum force, and displacement convergence were $2.0 \times 10^{-5}$ Hartree, $4.0 \times 10^{-3}$ Hartree/Å, and $5.0 \times 10^{-3}$ Å, respectively.

To preserve the bulk-like rigidity below the surfaces and positions far from the interactions, some layers were kept fixed during the optimization of adsorption complexes. If this rigidity is lost due to truncation, the system behaves like a molecule with a certain degree of artificial flexibility, leading to an overestimation on the binding energy.

To evaluate the binding interactions (adsorption energy; $E_{ads}$), the energy difference between the adsorption complex ($E_{complex}$) and the corresponding constituents ($E_{acid/wax}$+ $E_{Cluster}$) are calculated while all the components (adsorption complex and its constituents) are in their lowest energy states; Equation 2.

$$E_{ads} = E_{complex} - (E_{acid/wax} + E_{Cluster}) \quad (2)$$

AFM images of the interface between the bitumen mixtures and the silica glass of the capillary tube were obtained. The glass interface is used as model for a siliceous aggregate surface, and characterization of hexadecanoic acid (HAD) crystal growth (or lack thereof) at this interface could be indicative of the efficacy of selected fillers (nanozeolite in this case) in mitigating fatty acid accumulation at bitumen aggregate interfaces. The height images were flattened with respect to the plane of the bitumen fracture surface in order to more clearly show any morphology that develops in the bitumen phase. The glass interface with non-doped bitumen is featureless whereas the interface with acid-doped bitumen shows features resulting from HDA accumulation and crystallization. In both pristine zeolite and wax-impregnated zeolite cases, the interfacial features are reduced but not eliminated.

AFM images showed smooth areas of the bitumen fracture surface away from any visible particulates. These open areas appeared mostly featureless for all samples except for the bitumen containing wax-impregnated zeolite. In that sample, the open areas of the fracture surface are populated by microscopic linear features. Paraffin wax is known to crystallize in lamellar sheets on the order of 10 nm thick, so these linear features are believed to be cross-sections of crystallized wax lamellae. While some wax crystals appear naturally in many bitumen, they tend to be sparse. In the bitumen containing wax-impregnated zeolite, the wax is released from the zeolite into the bitumen and crystallizes upon cooling. Neither zeolite nor HDA appear to significantly disrupt wax crystallization. Release of wax from zeolite into bitumen and subsequent crystallization of wax molecules were evidenced in rheological results. Bitumen doped with wax-impregnated zeolite containing 2% wax had nearly the same reduction in complex modulus as bitumen doped with similar amount straight wax. Therefore, the observed reduction was attributed to the role of wax on bitumen rheology. Crystallization of released wax was reflected in high reduction in low temperature cracking when wax-impregnated zeolite showed nearly the same low temperature cracking temperature as bitumen containing same amount of wax.

AFM images of the bitumen fracture surface showed visible clusters of zeolite nanorods. Blending with bitumen at 120° C. does not appear to adversely affect the nanorod morphology. Despite the reduction of acid crystallization at the interface of bitumen-glass in these samples, suggesting the adsorbent role of zeolite nanorods for acid, AFM images do not show an excessive growth of acid microstructures around the zeolite nanoparticles. The lack of clear HDA-related microstructures around zeolite nanorods may be attributed to the large total surface area of zeolite nanoparticles leading to spread of accumulated HDA, preventing it from reaching high enough local concentration to nucleate crystals. The higher curvature of the zeolite nanorods reinforces the hypothesis of the formation of only a monolayer of HDA on the surface of zeolite nanorods.

The reduction of HDA accumulation at the bitumen-glass interface supports the performance of zeolite nanorods as the HAD adsorbent, though HAD does not appear to significantly infiltrate the nanopores of the zeolite; HDA (molecular weight 256.4 g/mol) may be too large to quickly or effectively move down the nanopores. In some cases, anions ($OH^-$, $SO_4^{2-}$, $CO_3^{2-}$, etc.) or metal cations may fill the pores and block entrance of any other molecules.

The adsorption behavior of dodecane, a liquid alkane hydrocarbon with the chemical formula of $CH_3(CH_2)_{10}CH_3$ representing a chain of wax, and dodecanoic acid (lauric acid), a medium-chain (12-carbon) saturated fatty acid representing the alkanoic acid, on the target clusters cut out from the Faujasite surface was observed to gain an insight into the molecular level behavior of wax chains and acid in interaction with Fajusite-type zeolite containing high content of Na cations. The clusters cut from the periodic crystallographic structures are 1) a surface having a 12-membered ring window, an entrance into the supercage (largest cavity), and 2) the small cage of sodalite surrounded by some hexagonal prisms.

The (111) Faujasite surface is known as the most stable surface in which sodalite cages are not cut by the (111) surface, so they remain inaccessible for the large guest molecules. Indeed, the most active sites available are above the surface, as all the sodalite cages are intact. The surface adsorption of alkanoic acid (dodecanoic acid) and wax chain (dodecane) onto the 6-ring window of the intact sodalite cage available in (111) Faujasite surface. Although the head functional group of acid molecule (—COOH) gets closer to the entrance window of sodalite compared to the $CH_3$ head of wax, their corresponding adsorption energies do not show a considerable difference (−39.5 kcal/mol for acid, −38.6 kcal/mol for wax). The electrostatic repulsion forces resulting from the hydrogens of $CH_3$ and Na cation can justify the further distance of wax towards sodalite outer layer.

Unlike the (111) surface, (011) and (100) have incomplete sodalite cages. The sodalite cage is broken by three surfaces. The (011) surface passes the middle of the cage through 6-ring window, and (100) surface cut the cage in parallel and below the 4-ring window. The broken cage can be simulated by the cleaving along (011) surface. On the exposed surface, the dangling bonds were terminated to H atoms, not to exaggerate on the number of hydroxyl groups accessible to interact with coming guest molecules and consequently overestimation on adsorption energy values. Interaction of the broken cage with acid molecule is notably higher than that with wax chain; −43.5 kcal/mol compared to −38.4 kcal/mol. The more successful performance of acid molecules in surface adsorption can be attributed to the increase in the number of adsorption sites accompanied by the establishment of H-bonding and electrostatic interactions between acid functional group (—COOH) and the accessible active sites in broken cage (OH); suggesting that the particles containing (100) and (011) surface sites most likely are more effective sorbents than the (111) faceted particles.

Despite the better surface adsorption of acid compared to the wax molecules, the DFT calculations show the better diffusion of wax into broken cage compared to acid molecule. While the starting geometrical structures for both acid and wax were the same in a part of the calculations, wax calculations did not meet the convergence criteria and consistently continued to go down. Considering the lack of effective interaction between the contents of cage (Na cations) and CH groups of the alkane chain, more displacements of the wax into medium of cavity are expected in order to reach the stable states. This intensifies the theory of better migration of wax into the cavities of Faujasite compared to acid molecules, despite the better surface adsorption of acid.

Selectivity in large cavities or channels is among the unique features of zeolites that determines capacity of a particular zeolite to catalyze some reactions and exclude others. The shape selectivity is defined as a zeolite's character by which some reactants or reaction products are restricted from diffusing through the zeolite pores due to incompatibilities caused by their size and/or shape; the bulky guest molecules are sterically hindered to move throughout the zeolite's pores.

In the case of wax and acid molecules selected in this study, selectivity in pores manifests itself in the form of "interaction selectivity". Open cavities in Fajusite-Na are in the form of sodalites and supercages occupied by a large number of extra-framework cations of Na able to have effective electrostatic interactions with the guest molecules. These interactions may facilitate or restrict the passage of the guest molecules into the cavities.

To gain an insight into strength of interactions for a chain of wax and an acid molecule into the pores, the presence of acid and wax molecules in entrance window of Faujasite's supercage is simulated. Based on the results, interaction of the acid molecule with the supercage window cluster, $E_{ads}=-65.8$ kcal/mol, is notably higher than that of the wax molecule in this entrance window, $E_{ads}=-45.5$ kcal/mol. The noticeable energy difference for two interactions, $\Delta E=20.3$ kcal/mol, further suggests that although stronger interactions lead to the better surface adsorption of acid molecules, it may not necessarily lead to the better penetration of acid molecules into cavities compared to the wax.

The extensive space of the supercage window imposes this idea that the individual molecules of acid and wax receive the electrostatic forces arising from Na cations, available in a large number, before those of side walls originating from Si and Al tetrahedrons. In this respect, stronger interactions of acid molecule in the center of 12-member ring window originate from the electrostatic interactions between Na cations and acid functional group (—COOH) which could be in the attraction nature, compared to the weaker interactions of head group of wax (—CH$_3$) which is repulsive in nature. To emphasize on the role of Na cations, the size of pores and total volume of the zeolite are directly affected by the type and the number of cations present, due to pore blocking resulting from the occupation of cationic sites. Monovalent cations occupying every cationic site present smaller pore volume compared to divalents occupying every other cationic position.

Thus, the performance of wax-impregnated zeolite in the matrix of bitumen, gradual discharge of melted wax stored in zeolite's pores with rising the temperature, and replacement of the evacuated spots with acid molecules such as fatty acids were described. Images collected by AFM showed wax molecules are released from zeolite and crystallize in bitumen. Surface adsorption of acid by zeolite nanoparticles is supported by the AFM images indicating the reduction of acid crystallization at the interface of bitumen-glass. However, this reduction is not accompanied by an excessive growth of acid-related microstructures around the zeolite nanoparticles; this might be due to the large total surface area of zeolite nanoparticles leading to spread of accumulated HDA preventing it to reach high enough local concentration to nucleate crystals or leading to the formation of only a monolayer of acid on the surface of zeolite nanorods.

On the basis of DFT results, selectivity in zeolite's pores manifests itself in the "interaction selectivity", due to a large number of extra-framework cations of Na improving the effective electrostatic interactions with the guest molecules. The lesser effect of the electrostatic field of cations on a nonpolar molecule such as wax, compared to a polar acid molecule, leads to a better penetration of wax and weak penetration of acid molecules into the zeolite's pores. This is consistent with AFM results suggesting that only a part of acid content is adsorbed by zeolite nanoparticles.

Interaction of the acid molecule with the supercage window is notably higher than that of the wax molecule in this entrance window; $\Delta E=20.3$ kcal/mol. In the case of small cages, the incomplete sodalites, created by the (011) and (100) cuts, adsorb acid molecules better than that of the intact cages in (111) faceted particles, highlighting the significate effect of surface structure on surface adsorption. Better adsorption in broken cages are ascribed to the increased number of OH groups accessible for interaction with polar head of acid. While the surface adsorption of acid exceeds that of the wax molecules, DFT calculations show a weaker penetration of acid molecules into the broken cages compared to the wax molecules.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A modified bitumen comprising:
   bitumen; and
   composite particles comprising:
   aluminosilicate nanostructures comprising nano-zeolite particles and defining nanopores and micropores; and paraffin wax adhered to surfaces of the aluminosilicate nanostructures,
wherein a total amount of paraffin wax in the modified bitumen comprises:
the paraffin wax adhered to the surfaces of the aluminosilicate nanostructures; and
an additional amount of paraffin wax, and
wherein the total amount of the paraffin wax comprises 0.1 wt % to 10 wt % of a weight of the bitumen and the composite particles.

2. The modified bitumen of claim 1, wherein the total amount of the paraffin wax comprises 1 wt % to 10 wt % of the weight of the bitumen and the composite particles.

3. The modified bitumen of claim 1, wherein the aluminosilicate nanostructures adsorb or neutralize acid.

4. The modified bitumen of claim 1, wherein the aluminosilicate nanostructures emit water.

5. The modified bitumen of claim 1, wherein the surfaces comprise exterior surfaces of the aluminosilicate nanostructures.

6. The modified bitumen of claim 1, wherein the surfaces comprise interior surfaces of the aluminosilicate nanostructures.

7. The modified bitumen of claim 6, wherein the paraffin wax is impregnated in the nanopores and micropores of the aluminosilicate nanostructures.

8. The modified bitumen of claim 1, wherein the modified bitumen, when heated, releases the paraffin wax from the nanopores and micropores to yield paraffin wax in the bitumen and locations vacated by the paraffin wax.

9. The modified bitumen of claim 8, wherein the paraffin wax in the bitumen is crystallized in the bitumen.

10. The modified bitumen of claim 8, wherein the locations vacated by the paraffin wax adsorb organic acids in the bitumen.

11. A method of modifying bitumen, the method comprising:
combining bitumen and a multiplicity of composite particles, wherein each composite particle comprises:
aluminosilicate nanostructures comprising nano-zeolite particles and defining nanopores and micropores; and
paraffin wax adhered to surfaces of the aluminosilicate nanostructures, wherein a total amount of paraffin wax in the modified bitumen comprises:
the paraffin wax adhered to the surfaces of the aluminosilicate nanostructures; and
an additional amount of paraffin wax, and
wherein the total amount of the paraffin wax comprises 0.1 wt % to 10 wt % of a weight of the bitumen and the composite particles.

12. The method of claim 11, wherein the paraffin wax is impregnated in the nanopores and the micropores of the aluminosilicate nanostructures.

13. The method of claim 11, wherein combining the bitumen and the multiplicity of the composite particles releases a portion of the paraffin wax from the composite particles.

14. A method of forming a bitumen modifier, the method comprising:
heating zeolite nanostructures comprising nano-zeolite particles and defining nanopores and micropores;
contacting the zeolite nanostructures with melted paraffin wax; and
solidifying the paraffin wax, thereby adhering the paraffin wax to surfaces of the zeolite nanostructures.

15. The method of claim 14, further comprising impregnating the zeolite nanostructures with the melted paraffin wax.

16. A bitumen modifier comprising:
zeolite nanostructures comprising nano-zeolite particles and defining nanopores and micropores; and
paraffin wax adhered to the zeolite nanostructures.

17. The bitumen modifier of claim 16, wherein the paraffin wax is impregnated in the nanopores and the micropores of the zeolite nanostructures.

* * * * *